(12) United States Patent
Hirabayashi et al.

(10) Patent No.: US 7,123,488 B2
(45) Date of Patent: Oct. 17, 2006

(54) DC/DC CONVERTER INCLUDING A ZENER DIODE HAVING A SUBSTANTIALLY ZERO TEMPERATURE COEFFICIENT

(75) Inventors: Masayuki Hirabayashi, Fukuoka (JP); Hirotaka Yamamoto, Fukuoka (JP); Eiji Yoshida, Fukuoka (JP); Toru Yoshino, Fukuoka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/998,234

(22) Filed: Nov. 24, 2004

(65) Prior Publication Data
US 2005/0162872 A1 Jul. 28, 2005

(30) Foreign Application Priority Data
Jan. 26, 2004 (JP) .............................. 2004-016575

(51) Int. Cl.
*H02M 3/335* (2006.01)

(52) U.S. Cl. ........................ 363/19; 363/21.16; 363/97

(58) Field of Classification Search ............ 363/18–20, 363/21.01, 21.08, 21.16, 97, 131
See application file for complete search history.

(56) References Cited

U.S. PATENT DOCUMENTS

| | | | |
|---|---|---|---|
| 3,268,739 A | 8/1966 | Dickson, Jr. | |
| 4,200,877 A * | 4/1980 | Suzuki et al. | 257/49 |
| 5,369,307 A | 11/1994 | Kobayashi | |
| 6,101,103 A * | 8/2000 | Miyazaki et al. | 363/19 |
| 6,690,586 B1 * | 2/2004 | Hosotani et al. | 363/19 |

FOREIGN PATENT DOCUMENTS

| | | |
|---|---|---|
| JP | 56-5507 Y2 | 2/1981 |
| JP | 60-219964 | 11/1985 |
| JP | 01-310413 | 12/1989 |
| JP | 8-275523 A | 10/1996 |
| JP | 11-98838 A | 4/1999 |
| JP | 2001-290544 | 10/2001 |

* cited by examiner

*Primary Examiner*—Gary L Laxton
(74) *Attorney, Agent, or Firm*—Frishauf, Holtz, Goodman & Chick, P.C.

(57) ABSTRACT

A DC/DC converter has a transformer having a primary winding, a secondary winding, and an auxiliary winding, a switching transistor connected in series to the primary winding, a control transistor for turning the switching transistor on or off, and a feedback control circuit connected to the control transistor and the auxiliary winding. The feedback control circuit includes a Zener diode having a substantially zero temperature coefficient. The Zener diode has a Zener voltage which lies in a range between 5 volts and 6 volts. In order to cancel a temperature characteristic of the control transistor, the temperature coefficient of the Zener diode is selected.

7 Claims, 3 Drawing Sheets

DC/DC CONVERTER INCLUDING A ZENER DIODE HAVING A SUBSTANTIALLY ZERO TEMPERATURE COEFFICIENT

This application claims priority to prior Japanese patent application JP 2004-16575, the disclosure of which is incorporated herein by reference.

BACKGROUND OF THE INVENTION

This invention relates to a DC/DC converter and, in particular, to a step-down DC/DC converter.

In the manner which is well known in the art, the DC/DC converter is a power converter for converting a DC voltage (an input DC voltage) having a voltage level into another DC voltage (an output DC voltage) having anther voltage level. The DC/DC converter is also called a switching regulator, a switching power source, or a ringing choke converter. The DC/DC converter where the output DC voltage has the voltage level higher than that of the input DC voltage is called a step-up DC/DC converter. The DC/DC converter where the output DC voltage has the voltage level lower than that of the input DC voltage is called a step-down DC/DC converter. This invention relates to the step-down DC/DC converter.

The step-down DC/DC converter uses a transistor as a switch, switches the transistor, converts an input DC voltage into an AC voltage, steps the AC voltage down by using a transformer, and rectifiers it to convert an output DC voltage.

In general, the DC/DC converter of the type described comprises a transformer having a primary winding, a secondary winding, and an auxiliary winding. The auxiliary winding is called a feedback winding, a positive feedback winding, a feedback coil, or a base winding. A switching transistor is connected in series to the primary winding of the transformer. By making the switching transistor self-oscillation, energy is transmitted to the secondary winding. The DC/DC converter further comprises a control transistor for turning the switching transistor on or off. A feedback control circuit including a Zener diode is connected between the control transistor and the auxiliary winding.

Various DC/DC converters of the type are already known. By way of example, a switching power source for controlling current characteristics on a primary side is described in Japanese Published Patent Application (A) No. H11-98838 or JP 11-98838 A. The switching power source disclosed in JP 11-98838 A realizes stable performance which is independent of an input voltage and external factors such as environmental temperature. The switching power source uses, as the above-mentioned Zener diode, a diode having a positive temperature coefficient (e.g. a "positive temperature characteristic" where its Zener voltage becomes high when the temperature becomes high). In addition, the switching power source comprises a temperature detecting resistor for correcting variations of the current characteristics due to variations of the environmental temperature. That is, in JP 11-98838 A, the switching power source needs the temperature detecting resistor because of use of the diode having the positive temperature coefficient as the Zener diode.

On the other hand, a ringing choke converter is disclosed in Japanese Published Patent Application (A) No. H8-275523 or JP 8-275523 A. The ringing choke converter disclosed in JP 8-275523 A comprises, as the Zener diode, a diode having a negative temperature coefficient (e.g. a "negative temperature characteristic" where its Zener voltage becomes low when the temperature becomes high). In JP 8-275523 A, the ringing choke converter needs any temperature compensation because of use of the diode having the negative temperature coefficient as the Zener diode.

In addition, a DC/DC converter is disclosed in Japanese Examined Utility Model Application Publication (Y) No. S56-5507 or JP 56-5507 Y. The DC/DC converter disclosed in JP 56-5507 Y comprises a Zener diode for controlling an output voltage without the above-mentioned control transistor. The above-mentioned JP 56-5507 Y merely discloses the DC/DC converter which carries out an output voltage control on the primary side of the transformer but which does not carry out an output current control on the primary side of the transformer.

SUMMARY OF THE INVENTION

It is therefore an object of the present invention to provide a DC/DC converter which dose not need a particular part for temperature compensation.

Other objects of this invention will become clear as the description proceeds.

On describing the gist of an aspect of this invention, it is possible to be understood that a DC/DC converter comprises a transformer having a primary winding, a secondary winding, and an auxiliary winding, a switching transistor connected in series to the primary winding of the transformer, a control transistor for turning the switching transistor on or off, and a feedback control circuit connected between the control transistor and the auxiliary winding of the transformer. The feedback control circuit includes a Zener diode.

According to the aspect of this invention, in the above-mentioned DC/DC converter, the Zener diode has a substantially zero temperature coefficient. Preferably, the Zener diode may have a Zener voltage which lies in a range between 5 volts and 6 volts. Desirably, the temperature coefficient of said Zener diode may be selected so as to cancel a temperature characteristic of the control transistor.

In addition, each of the switching transistor and the control transistor may be composed of, for example, an npn-type bipolar transistor. In this event, the switching transistor has a collector connected to an end of the primary winding while the switching transistor has an emitter which is grounded. The control transistor has a collector connected to a base of the switching transistor, while the control transistor has an emitter which is grounded. The auxiliary winding has an end which is grounded. The feedback control circuit is inserted between another end of the auxiliary winding and a base of the control transistor. The feedback control circuit may comprise, for example, the Zener diode which has an anode connected to a base of the control transistor and a cathode connected to the other end of the auxiliary winding, and a resistor connected in parallel to the Zener diode.

Alternatively, the feedback control circuit may comprise the Zener diode having an anode connected to a base of the control transistor, a first resistor having an end connected to a cathode of the Zener diode, a second resistor which has an end connected to the base of the control transistor and another end connected to another end of the first transistor, and a third resistor connected between the other end of the second resistor and the other end of the auxiliary winding. The above-mentioned DC/DC converter further may comprise a capacitor having an end which is grounded, and a second Zener diode which has an anode connected to another end of the capacitor and a cathode connected to the base of the switching transistor.

DESCRIPTION OF THE PREFERRED EMBODIMENTS

In the manner which is described above, the conventional DC/DC converters use, as a Zener diode, a diode having a positive or a negative temperature coefficient. Therefore, it is understood that various temperature compensations are necessary to the conventional DC/DC converters.

Accordingly, the present co-inventors reached an idea that uses, as the Zener diode, a diode having a substantially zero temperature coefficient.

Now, attention will be directed to a Zener diode. There are two causes why current flows abruptly when a voltage is applied to the Zener diode in a reverse direction. One cause is a Zener breakdown due to a tunnel effect. Another cause is an avalanche breakdown due to an avalanche effect. The Zener diode is a diode where both effects are mixed little by little. The Zener breakdown dominates in the Zener diode having a relatively low Zener voltage while the avalanche breakdown dominates in the Zener diode having a relatively high Zener voltage. Both of the Zener breakdown and the avalanche breakdown are mixed at a proper rate in the Zener diode having the Zener voltage of about 5 volts.

The description will proceed to a temperature characteristic of the Zener diode. The tunnel effect has a negative temperature coefficient. The avalanche effect has a positive temperature coefficient. As a result, the temperature characteristic of the Zener diode largely changes dependent on the Zener voltage. Inasmuch as the tunnel effect and the avalanche effect are effective at the similar rate when the Zener voltage is equal to about 5 volts, the both temperature coefficients are cancelled to each other, whereby the Zener voltage hardly changes even if the temperature changes.

On the other hand, the above-mentioned control transistor has a temperature characteristic. In general, a transistor has a negative temperature characteristic of $-2$ mV/° C. which is generally used. As a result, it is necessary to take account of the temperature characteristic of the control transistor.

Figure 1:
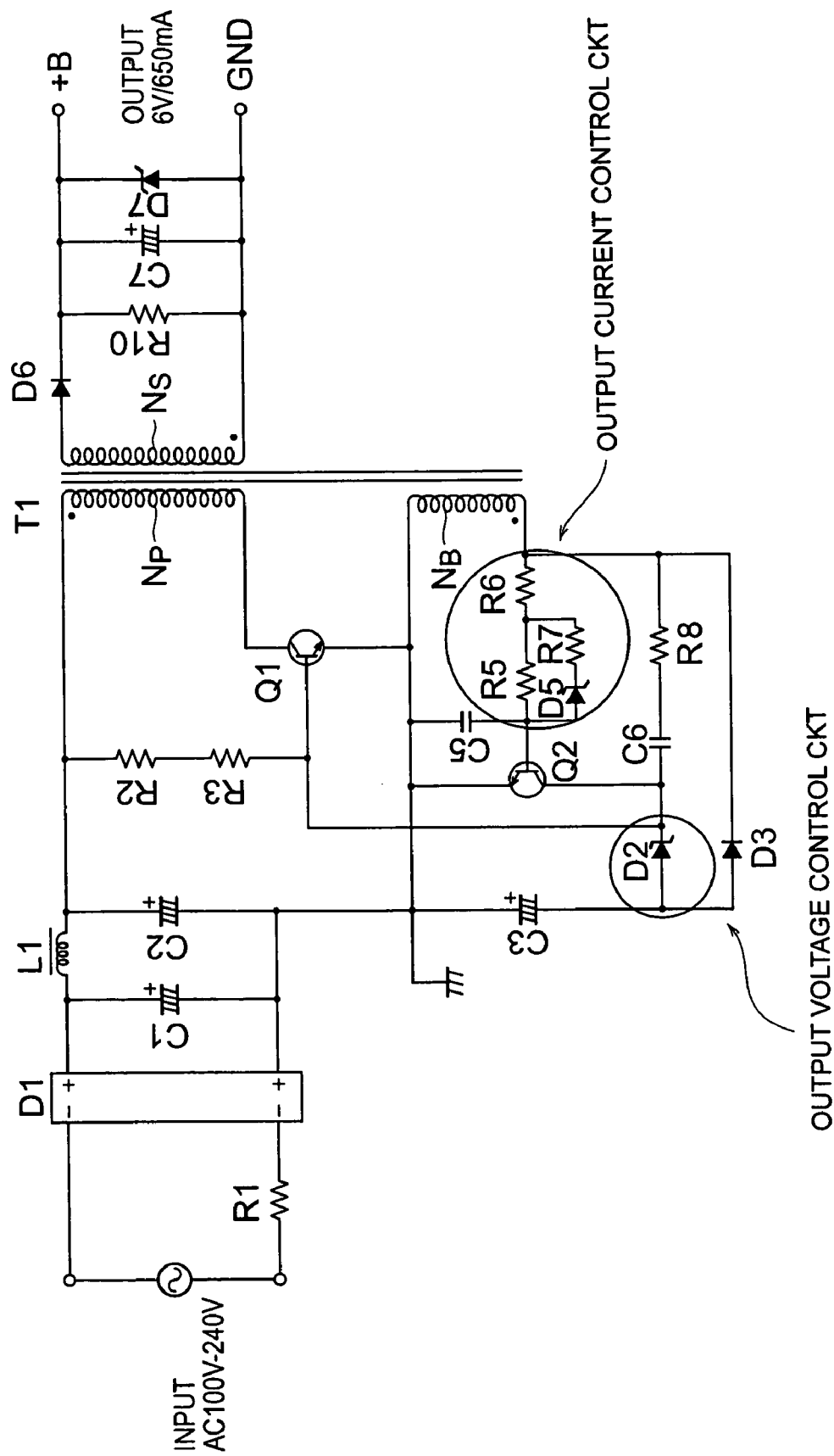
FIG. 1 is a circuit diagram of a DC/DC converter according to a first embodiment of this invention.

Referring to FIG. 1, the description will proceed to a DC/DC converter according to a first embodiment of shit invention. The illustrated DC/DC converter comprises a transformer T1 having a primary winding $N_P$, a secondary winding $N_S$, and an auxiliary winding $N_B$.

The DC/DC converter includes, on a primary side of the transformer T1, a rectifying circuit D1, a first input capacitor C1, an input inductor L1, a second input capacitor C2, a switching transistor Q1, a control transistor Q2, a control feedback circuit (which will later be described), and so on. The first input capacitor C1, the input inductor L1, and the second input capacitor C2 constitute a smoothing circuit.

An AC power source is connected to the rectifying circuit D1 through a resistor R1. The illustrated AC power source generates, as an input AC voltage, a voltage between 100 volts and 240 volts. The input AC voltage is rectified by the rectifying circuit D1, is smoothed by the above-mentioned smoothing circuit, and is stored in the second input capacitor C2 as an input DC voltage.

The switching transistor Q1 is connected in series to the primary winding $N_P$ of the transformer T1. Specifically, the second input capacitor C2 has an end connected to an end of the primary winding $N_P$ of the transformer T1. The illustrated switching transistor Q1 consists of an npn-type bipolar transistor. The primary winding $N_P$ of the transformer T1 has another end connected to a collector of the switching transistor Q1. The switching transistor Q1 has an emitter which is grounded. Resistors R2 and R3 are connected in series between a base of the switching transistor Q1 and the end of the second input capacitor C2.

The input DC voltage is applied to the primary winding $N_P$ of the transformer T1 to turn the input DC voltage on or off by the switching transistor Q1. The control transistor Q2 is for turning the switching transistor Q1 on or off. Between the control transistor Q2 and the auxiliary winding $N_B$ of the transformer T1, the feedback control circuit, which will be presently described, is connected.

The control transistor Q2 consists of an npn-type bipolar transistor. The feedback control circuit comprises resistors R5, R6, R7 and a Zener diode D5. The resistors R5 and R6 are connected in series between a base of the control transistor Q2 and one end of the auxiliary winding $N_B$ of the transformer T1. The resistor R7 and the Zener diode D5 are connected in series between both ends of the resistor R5.

The control transistor Q2 has an emitter which is grounded. Between the base and the emitter of the control transistor Q2, a capacitor C5 is connected. Between the end of the auxiliary winding $N_B$ of the transformer T1 and an collector of the control transistor Q2, a resistor R8 and a capacitor C6 are connected in series. The collector of the control transistor Q2 is connected to the base of the switching transistor Q1.

A capacitor C3 has an end which is grounded. The capacitor C3 has another end which is connected to the base of the switching transistor Q1 through a Zener diode D2 and which is connected to the end of the auxiliary winding $N_B$ of the transformer T1 through a diode D3. In other words, between both ends of the diode D3, the Zener diode D2, the capacitor C6, and the resistor R8 are connected in series.

As one part in the feedback control circuit, the Zener diode D5 has a diode having a substantially zero temperature coefficient. More specifically, the Zener diode D5 has a Zener voltage which lies in a range between 5 volts and 6 volts. As a result, the illustrated DC/DC converter does not need a particular part for temperature compensation.

In addition, the feedback control circuit serves as an output current control circuit while the Zener diode D2 serves as an output voltage control circuit.

The DC/DC converter comprises, on a secondary side of the transformer T1, a diode D6, a resistor R10, an output capacitor C7, and a Zener diode D7. The secondary winding $N_S$ of the transformer T1 has an end connected to a grounding terminal GND of the DC/DC converter and another end connected to a power source terminal +B of the DC/DC converter through the diode D6. The resistor R10, the capacitor C7, and the Zener diode D7 are connected in parallel between the power source terminal +B and the grounding terminal GND.

Induced in the secondary winding $N_S$ of the transformer T1, an AC voltage is rectified by the diode D6 and is smoothed by the output capacitor C7 to produce a secondary output voltage between the power source terminal +B and the grounding terminal GND.

In the example being illustrated, the DC/DC converter produces the secondary output voltage of 6 volts and can flow an output current of 650 milliamperes from the power source terminal +B.

According to the DC/DC converter having the above-mentioned structure, it is possible to control the output constant voltage and the constant current on the primary side of the transformer T1 in the manner which will later be described and to stabilize the output concerning input fluctuations of the AC input voltage (100 volts to 240 volts).

First, the description will be made as regards a constant voltage control. A minus voltage of the auxiliary winding $N_B$ of the transformer T1 is controlled by the Zener diode D2 to control the secondary output voltage at a constant. By making coupling between the secondary winding $N_S$ and the auxiliary winding $N_B$ of the transformer T1 good, the input fluctuations of the AC input voltage is improved.

Subsequently, the description will be made as regards a constant current control. By adjusting a base current of the control transistor Q2 by the feedback control circuit (the output current control circuit), a collector current of control transistor Q2 is controlled so as to control the output current. By adding the Zener diode D5 having the substantially zero temperature coefficient, the input fluctuations of the AC input voltage is improved.

In the manner which is described above, the control transistor Q2 has the temperature characteristic. Accordingly, the temperature coefficient of the Zener diode D5 is selected so as to cancel the temperature characteristic of the control transistor Q2. As a result, as a whole of the DC/DC converter, a stable current characteristic is realized.

Figure 2:
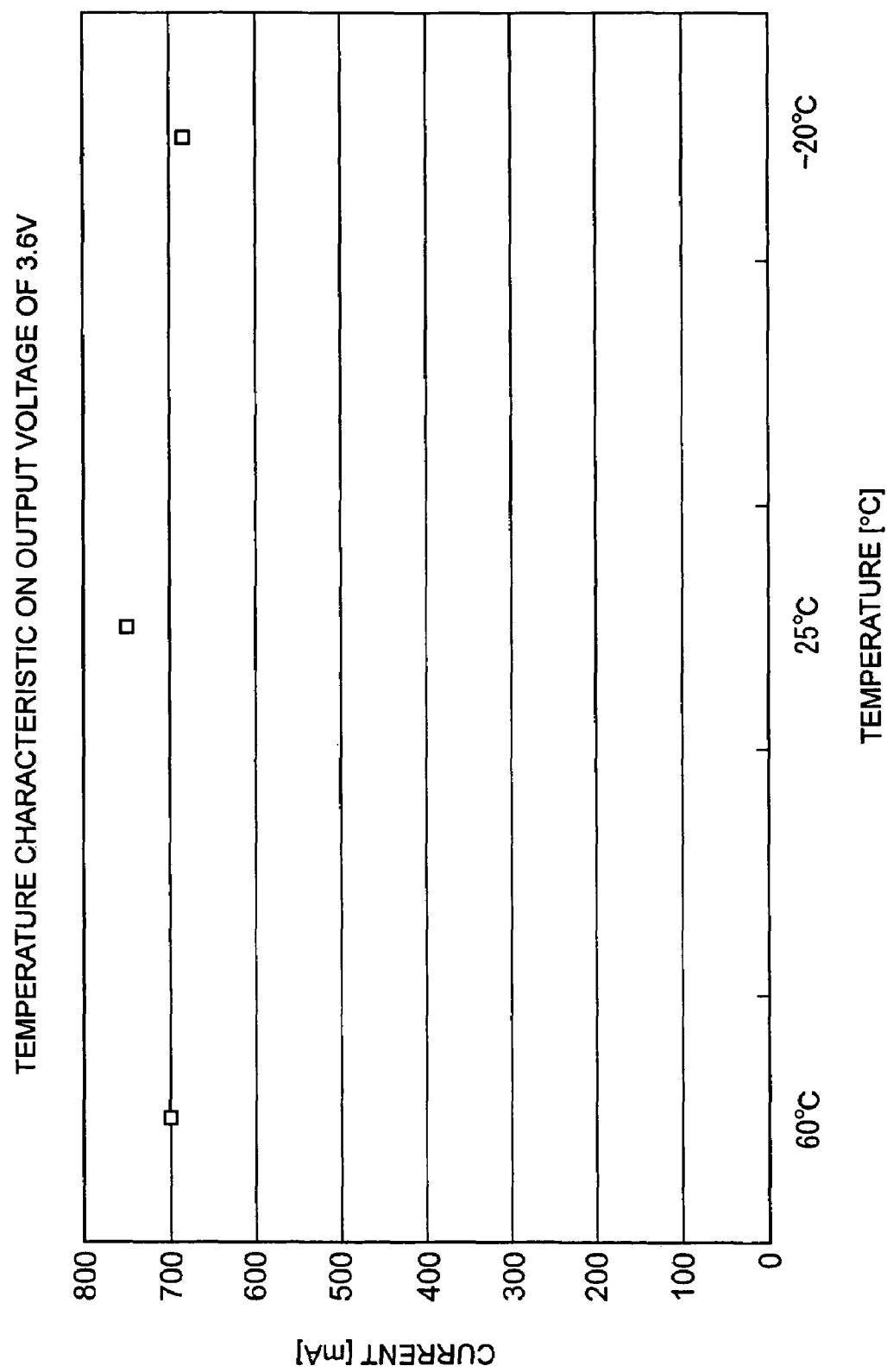
FIG. 2 is a view showing a temperature characteristic of the DC/DC converter illustrated in FIG. 1.

FIG. 2 shows a temperature characteristic of the output voltage in the DC/DC converter illustrated in FIG. 1. In FIG. 2, the abscissa represents temperature [° C.] and the ordinate represents current [mA]. FIG. 2 shows results measured at three temperatures of −20° C., 25° C., and 60° C. It may be understood that results change linearly at intermediate temperatures.

A temperature characteristic illustrated in FIG. 2 is obtained as follows. The DC/DC converter (product) used to measure has a rated output voltage/output current of 5.3 volts/600 milliamperes. When the output current flows 600 milliamperers or more, the output voltage reduces gradually. Date shown in FIG. 2 represent current values measured on a time when the output voltage is equal to 3.6 volts. That is, by changing the environmental temperature of the produce and by measuring the current value when the output voltage becomes 3.6 volts, the temperature characteristic shown in FIG. 2 is obtained.

In the manner which is apparent from FIG. 2, the measured results are settled in a dispersion range within about 10% at a temperature range between −20° C. and 60° C. From such a fact, it is understood that the temperature characteristic is adjusted in a range where can sufficiently use as actual products.

Although both controls of the output current control and the output voltage control are carried out on the primary side of the transformer in the DC/DC converter according to the first embodiment of this invention illustrated in FIG. 1, only the output current control may be carried out on the primary side of the transformer in a DC/DC converter according to a second embodiment of this invention which will later be described.

Figure 3:
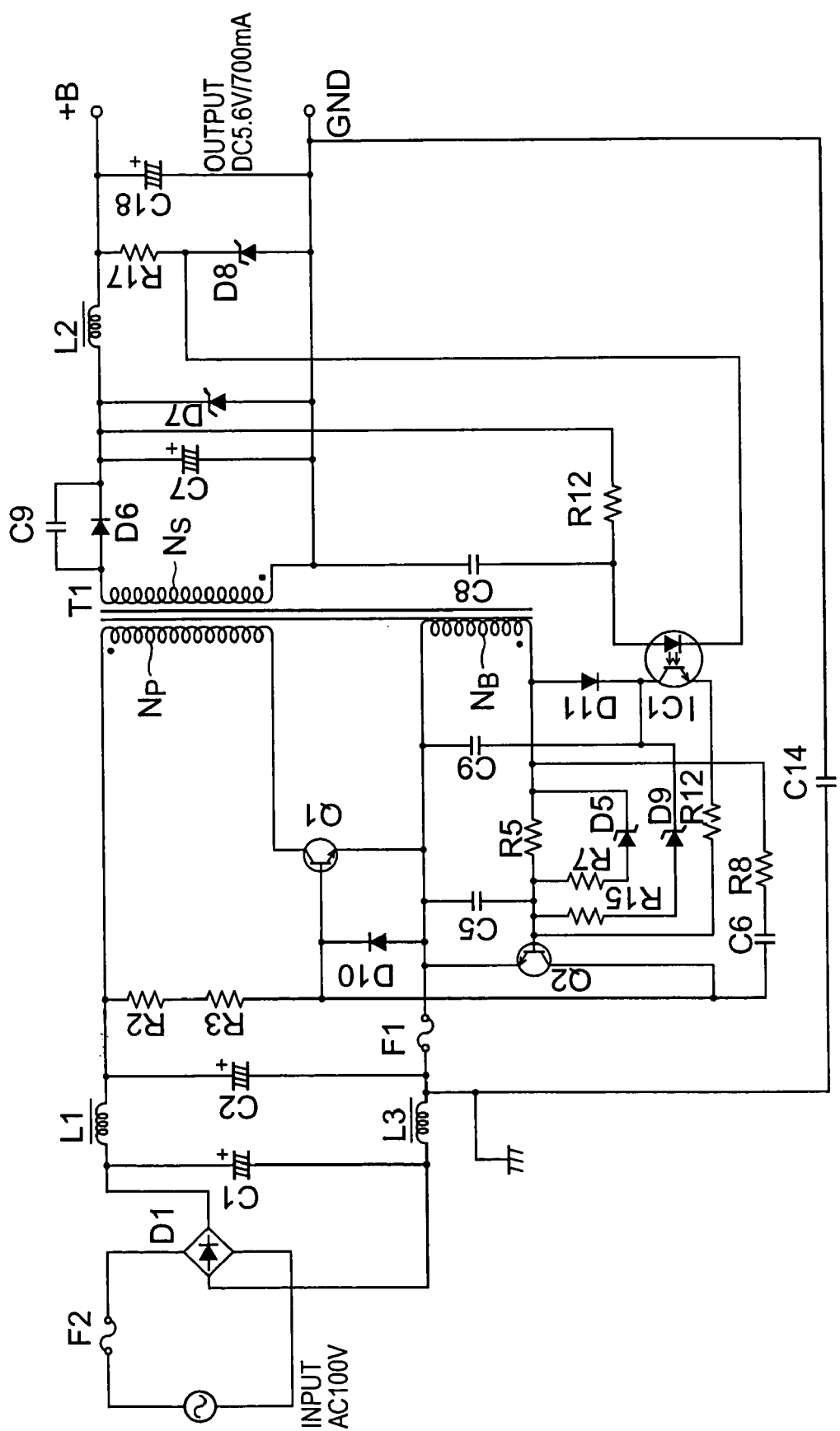
FIG. 3 is a circuit diagram of a DC/DC converter according a second embodiment of this invention.

Referring to FIG. 3, the description will proceed to the DC/DC converter according to the second embodiment of this invention. The same reference symbols are attached to those having similar functions to those illustrated in FIG. 1.

The AC power source is connected to the rectifying circuit D1 through a fuse F2. The illustrated AC power source generates an input AC voltage of AC 100 volts. The output terminals of the rectifying circuit D1 are connected to a smoothing circuit which consists of the first input capacitor C1, a first inductor L1, the second input capacitor C2, and a second inductor L2.

The smoothing circuit has an end connected to an end of the primary winding $N_P$ of the transformer T1. The primary winding $N_P$ of the transformer T1 has another end connected to the collector of the switching transistor Q1. The switching transistor Q1 has a base connected to the end of the primary winding $N_P$ of the transformer T1 through the resistors R3 and R2 which are connected in series to each other. Between the base and the emitter of the switching transistor Q1, a diode D10 is connected. The emitter of the switching transistor Q1 is grounded through a fuse F1.

The emitter of the switching transistor Q1 is connected to an end of the auxiliary winding $N_B$ of the transformer T1. Another end of the auxiliary winding $N_B$ of the transformer T1 is connected to the base of the control transistor Q2 through a feedback control circuit (an output current control circuit). The feedback control circuit comprises a parallel circuit which consists of the resistor R5 and a series circuit consisting of the Zener diode D5 and the resistor R7. Both ends of the auxiliary winding $N_B$ of the transformer T1, a capacitor C9 and a diode D11 are connected in series. Between a connecting point of the capacitor C9 and the diode D11 and the base of the control transistor Q2, a Zener diode D9 and a resistor R15 are connected in series. Between the other end of the auxiliary winding $N_B$ of the transformer T1 and the collector of the control transistor Q2, the resistor R8 and the capacitor C6 are connected in series. The collector of the control transistor Q2 is connected to the base of the switching transistor Q1. The emitter of the control transistor Q2 is connected to the base of the switching transistor Q1 through the diode D10.

On the other hand, the secondary winding $N_S$ of the transformer T1 has an end connected to the power source terminal +B through a parallel circuit consisting of the diode D6 and a capacitor C9 and an inductor L2. The secondary winding $N_S$ of the transformer T1 has another end which is connected to the grounding terminal GND. Between the power source terminal +B and the grounding terminal GND, the capacitor C7 and the Zener diode D7 are connected in parallel. In addition, between the power source terminal +B and the grounding terminal GND, a capacitor C18 is connected.

The DC/DC converter produces the secondary output voltage between the power source terminal +B and the grounding terminal GND. In the example being illustrated, the DC/DC converter produces the secondary output voltage of 5.6 volts and can flows an output current of 700 milliamperes from the power source terminal +B.

The DC/DC converter according to the second embodiment of this invention comprises a photocoupler IC1 for feeding the output voltage on the secondary side back to the primary side. The photocoupler IC1 comprises a photodiode and a phototransistor. The description will be made as regards a circuit for feeding back the output voltage.

Between the power source terminal +B and the grounding terminal GND, a resistor R17 and a Zener diode D8 are connected in series. A connecting point between the resistor R17 and the Zener diode D8 is connected to a cathode of the photodiode of the photocoupler IC1. The photodiode of the photocoupler IC1 has an anode which is connected to the grounding terminal GND through a capacitor C8 and which is connected to the power source terminal +B through a resistor R12 and the inductor L2.

On the other hand, the phototransistor of the photocoupler IC1 has a collector which is connected to the other end of the auxiliary winding $N_B$ of the transformer T1 through the diode D11 and which is connected to the base of the control transistor Q2 through a series circuit consisting of the diode D9 and the resistor R15. The phototransistor of the photocoupler IC1 has an emitter connected to the base of the control transistor Q2 through a resistor R12.

At any rate, the DC/DC converter according to the second embodiment of this invention carries out the output voltage control by feeding the output voltage on the secondary side of the transformer T1 back to the primary side of the transformer T1 by using the photocoupler IC1.

In the DC/DC converter according to the second embodiment of this invention, the Zener diode D5 as one part in the feedback control circuit has a diode having a substantially zero temperature coefficient. More specifically, the Zener diode D5 has a Zener voltage which lies in a range between 5 volts and 6 volts. As a result, the illustrated DC/DC converter does not need a particular part for temperature compensation.

In addition, in the manner which is described above, the control transistor Q2 has the temperature characteristic. Accordingly, the temperature coefficient of the Zener diode D5 is selected so as to cancel the temperature characteristic of the control transistor Q2. As a result, as a whole of the DC/DC converter, a stable current characteristic is realized.

Now, the description will be made as regards an output current control in the DC/DC converter having such a structure. It will be assumed that the output current of the DC/DC converter increases. In proportion to the output current, a voltage is induced in the auxiliary winding $N_B$ of the transformer T1. By the induced voltage, a current flowing through the resistor R5 in the feedback control circuit turns the control transistor Q2 on or off. By controlling the switching transistor Q1 by turning the control transistor Q2 on/off, the output current control is carried out.

While this invention has thus far been described in conjunction with a few preferred embodiments thereof, it will now readily possible for those skilled in the art to put this invention into various manners. For example, the feedback control circuit may be not restricted to those in the above-mentioned embodiments.

What is claimed is:

1. A DC/DC converter comprising:
   a transformer having a primary winding, a secondary winding, and an auxiliary winding;
   a switching transistor connected in series to the primary winding of the transformer;
   a control transistor for turning the switching transistor on or off; and
   a feedback control circuit which is connected between the control transistor and the auxiliary winding of the transformer, and which includes a Zener diode having a substantially zero temperature coefficient;
   wherein each of the switching transistor and the control transistor is composed of an npn-type bipolar transistor, the switching transistor has a collector that is connected to an end of the primary winding and an emitter that is grounded, and the control transistor has a collector that is connected to a base of the switching transistor and an emitter that is grounded;
   wherein the auxiliary winding has a first end that is grounded, and the feedback control circuit is inserted between a second end of the auxiliary winding and a base of the control transistor; and
   wherein said feedback control circuit comprises:
      said Zener diode, which has an anode connected to a base of said control transistor and a cathode connected to the second end of said auxiliary winding; and
      a resistor connected in parallel to said Zener diode.

2. The DC/DC converter as claimed in claim 1, wherein said Zener diode has a Zener voltage which lies in a range between 5 volts and 6 volts.

3. The DC/DC converter as claimed in claim 1 wherein the temperature coefficient of said Zener diode is selected so as to cancel a temperature characteristic of said control transistor.

4. A DC/DC converter comprising:
   a transformer having a primary winding, a secondary winding, and an auxiliary winding;
   a switching transistor connected in series to the primary winding of the transformer;
   a control transistor for turning the switching transistor on or off; and
   a feedback control circuit which is connected between the control transistor and the auxiliary winding of the transformer, and which includes a Zener diode having a substantially zero temperature coefficient;
   wherein each of the switching transistor and the control transistor is composed of an npn-bipolar transistor, the switching transistor has a collector that is connected to an end of the primary winding and an emitter that is grounded, and the control transistor has a collector that is connected to a base of the switching transistor and an emitter that is grounded;
   wherein the auxiliary winding has a first end that is grounded, and the feedback control circuit is inserted between a second end of the auxiliary winding and a base of the control transistor; and
   wherein said feedback control circuit comprises:
      said Zener diode which has an anode connected to a base of said control transistor,
      a first resistor which has a first end connected to a cathode of said Zener diode,
      a second resistor which has a first end connected to the base of said control transistor and a second end connected to a second end of said first resistor, and
      a third resistor connected between the second end of said second resistor and the second end of said auxiliary winding.

5. The DC/DC converter as claimed in claim 4, further comprising:
   a capacitor which has a first end that is grounded; and
   a second Zener diode which has an anode connected to a second end of said capacitor and a cathode connected to the base of said switching transistor.

6. The DC/DC converter as claimed in claim 4, wherein said Zener diode has a Zener voltage which lies in a range between 5 volts and 6 volts.

7. The DC/DC converter as claimed in claim 4, wherein the temperature coefficient of said Zener diode is selected so as to cancel a temperature characteristic of said control transistor.

* * * * *